United States Patent
Dugas

(10) Patent No.: US 8,254,052 B2
(45) Date of Patent: *Aug. 28, 2012

(54) METHOD OF MAKING A MULTI-CHANNEL TIME BASED SERVO TAPE MEDIA

(75) Inventor: Matthew P. Dugas, St. Paul, MN (US)

(73) Assignee: Advanced Research Corporation, White Bear Lake, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/113,598

(22) Filed: May 23, 2011

(65) Prior Publication Data

US 2011/0286126 A1 Nov. 24, 2011

Related U.S. Application Data

(63) Continuation of application No. 12/430,653, filed on Apr. 27, 2009, now Pat. No. 7,948,705, which is a continuation of application No. 11/842,692, filed on Aug. 21, 2007, now Pat. No. 7,525,761, which is a continuation of application No. 11/126,956, filed on May 11, 2005, now abandoned, which is a continuation of application No. 10/160,397, filed on May 31, 2002, now Pat. No. 6,894,869, which is a continuation of application No. 09/475,420, filed on Dec. 30, 1999, now Pat. No. 6,496,328.

(51) Int. Cl.
  *G11B 5/02* (2006.01)
(52) U.S. Cl. ......................................... 360/75
(58) Field of Classification Search ................. None
  See application file for complete search history.

(56) References Cited

U.S. PATENT DOCUMENTS

| 2,938,962 | A | 5/1960 | Konins et al. |
| 3,192,608 | A | 7/1965 | Rinia et al. |
| 3,417,386 | A | 12/1968 | Schneider |
| 3,699,334 | A | 10/1972 | Cohen et al. |
| 3,750,828 | A | 8/1973 | Constable |
| 3,853,715 | A | 12/1974 | Romankiw |

(Continued)

FOREIGN PATENT DOCUMENTS

DE        2912309        10/1979

(Continued)

OTHER PUBLICATIONS

Hisatoshi, Hata, Patent Abstracts of Japan (Publication No. 06333210), Feb. 12, 1994.

(Continued)

*Primary Examiner* — K. Wong
*Assistant Examiner* — James L Habermehl
(74) *Attorney, Agent, or Firm* — Winthrop & Weinstine, P.A.

(57) ABSTRACT

A thin film magnetic recording head is fabricated by forming a substrate from opposing ferrite blocks which have a ceramic member bonded between them. This structure is then diced to form a plurality of columns, wherein each column has a ferrite/ceramic combination. Each column represents a single channel in the completed head. A block of ceramic is then cut to match the columned structure and the two are bonded together. The bonded structure is then cut or ground until a head is formed, having ceramic disposed between each channel. A ferrite back-gap is then added to each channel, minimizing the reluctance of the flux path. The thin film is patterned on the head to optimize various channel configurations.

18 Claims, 10 Drawing Sheets

U.S. PATENT DOCUMENTS

| | | |
|---|---|---|
| 4,007,493 A | 2/1977 | Behr et al. |
| 4,088,490 A | 5/1978 | Duke et al. |
| 4,268,881 A | 5/1981 | Saito |
| 4,298,899 A | 11/1981 | Argumedo et al. |
| 4,314,290 A | 2/1982 | Ragle |
| 4,318,146 A | 3/1982 | Ike et al. |
| 4,408,240 A | 10/1983 | Pastore |
| 4,457,803 A | 7/1984 | Takigawa |
| 4,488,188 A | 12/1984 | Hansen et al. |
| 4,490,756 A | 12/1984 | Dost et al. |
| 4,535,376 A | 8/1985 | Nomura et al. |
| 4,539,615 A | 9/1985 | Arai et al. |
| 4,586,094 A | 4/1986 | Chambors et al. |
| 4,598,327 A | 7/1986 | Jen et al. |
| 4,609,959 A | 9/1986 | Rudi |
| 4,642,709 A | 2/1987 | Vinal |
| 4,673,999 A | 6/1987 | Suyama et al. |
| 4,685,012 A | 8/1987 | DeWit et al. |
| 4,752,850 A | 6/1988 | Yamada et al. |
| 4,758,304 A | 7/1988 | McNeil et al. |
| 4,758,907 A | 7/1988 | Okamoto et al. |
| 4,837,924 A | 6/1989 | Lazzari |
| 4,897,748 A | 1/1990 | Takahashi et al. |
| 4,901,178 A | 2/1990 | Kobayashi et al. |
| 4,906,552 A | 3/1990 | Ngo et al. |
| 4,914,805 A | 4/1990 | Kawase |
| 4,927,804 A | 5/1990 | Zieren et al. |
| 4,945,438 A | 7/1990 | Matsumoto et al. |
| 4,971,947 A | 11/1990 | Barnes et al. |
| 4,992,897 A | 2/1991 | Deroux-Dauphin |
| 5,016,342 A | 5/1991 | Pisharody et al. |
| 5,017,326 A | 5/1991 | Wash et al. |
| 5,027,244 A | 6/1991 | Hayakawa |
| 5,035,787 A | 7/1991 | Parker et al. |
| 5,055,951 A | 10/1991 | Behr |
| 5,067,230 A | 11/1991 | Meunier et al. |
| 5,079,663 A | 1/1992 | Ju et al. |
| 5,086,015 A | 2/1992 | Itoh et al. |
| 5,090,111 A | 2/1992 | Lazzari |
| 5,093,980 A | 3/1992 | Maurice et al. |
| 5,124,869 A | 6/1992 | Lehureau |
| 5,126,231 A | 6/1992 | Levy |
| 5,132,861 A | 7/1992 | Behr et al. |
| 5,160,078 A | 11/1992 | Spicer |
| 5,189,580 A | 2/1993 | Pisharody et al. |
| 5,195,006 A | 3/1993 | Morikawa |
| 5,196,969 A | 3/1993 | Iwamatsu et al. |
| 5,211,734 A | 5/1993 | Yagami et al. |
| 5,224,260 A | 7/1993 | Fedeli et al. |
| 5,241,442 A | 8/1993 | Akashi |
| 5,262,908 A | 11/1993 | Iwamatsu et al. |
| 5,280,402 A | 1/1994 | Anderson et al. |
| 5,293,281 A | 3/1994 | Behr et al. |
| 5,301,418 A | 4/1994 | Dirne et al. |
| 5,307,217 A | 4/1994 | Saliba |
| 5,309,299 A | 5/1994 | Crossland et al. |
| 5,319,502 A | 6/1994 | Feig |
| 5,321,570 A | 6/1994 | Behr et al. |
| 5,371,638 A | 12/1994 | Saliba |
| 5,379,170 A | 1/1995 | Schwarz |
| 5,394,285 A | 2/1995 | Dee et al. |
| 5,398,145 A | 3/1995 | Jeffers et al. |
| 5,402,295 A | 3/1995 | Suzuki et al. |
| 5,405,734 A | 4/1995 | Aita |
| 5,423,116 A | 6/1995 | Sundaram |
| 5,432,652 A | 7/1995 | Comeaux et al. |
| 5,434,732 A | 7/1995 | Schwarz et al. |
| 5,447,598 A | 9/1995 | Mihara et al. |
| 5,450,257 A | 9/1995 | Tran et al. |
| 5,452,152 A | 9/1995 | Rudi |
| 5,452,165 A | 9/1995 | Chen et al. |
| 5,452,166 A | 9/1995 | Aylwin et al. |
| 5,488,525 A | 1/1996 | Adams et al. |
| 5,504,339 A | 4/1996 | Masuda |
| 5,506,737 A | 4/1996 | Lin et al. |
| 5,523,185 A | 6/1996 | Goto |
| 5,523,904 A | 6/1996 | Saliba |
| 5,552,944 A | 9/1996 | Clemow |
| 5,567,333 A | 10/1996 | Hira et al. |
| 5,572,392 A | 11/1996 | Aboaf et al. |
| 5,587,307 A | 12/1996 | Alborn, Jr. et al. |
| 5,593,065 A | 1/1997 | Harrold |
| 5,602,703 A | 2/1997 | Moore et al. |
| 5,606,478 A | 2/1997 | Chen et al. |
| 5,616,921 A | 4/1997 | Talbot et al. |
| 5,621,188 A | 4/1997 | Lee et al. |
| 5,629,813 A | 5/1997 | Baca et al. |
| 5,639,509 A | 6/1997 | Schemmel |
| 5,652,015 A | 7/1997 | Aboaf et al. |
| 5,655,286 A | 8/1997 | Jones, Jr. |
| 5,665,251 A | 9/1997 | Robertson et al. |
| 5,666,249 A | 9/1997 | Ohmori et al. |
| 5,675,461 A | 10/1997 | Aylwin et al. |
| 5,677,011 A | 10/1997 | Hatakeyama et al. |
| 5,680,278 A | 10/1997 | Sawtelle, Jr. |
| 5,689,384 A | 11/1997 | Albrecht et al. |
| 5,710,673 A | 1/1998 | Varian |
| 5,715,597 A | 2/1998 | Aylwin et al. |
| 5,719,730 A | 2/1998 | Chang et al. |
| 5,723,234 A | 3/1998 | Yokoyama et al. |
| 5,726,841 A | 3/1998 | Tong et al. |
| 5,737,826 A | 4/1998 | Slade et al. |
| 5,742,452 A | 4/1998 | Simmons et al. |
| 5,751,526 A | 5/1998 | Schemmel |
| 5,752,309 A | 5/1998 | Partee et al. |
| 5,757,575 A | 5/1998 | Hallamasek et al. |
| 5,768,070 A | 6/1998 | Krounbi et al. |
| 5,771,142 A | 6/1998 | Maurice et al. |
| 5,793,577 A | 8/1998 | Katz et al. |
| 5,822,159 A | 10/1998 | Fukuyama et al. |
| 5,831,792 A | 11/1998 | Ananth |
| 5,863,450 A | 1/1999 | Dutertre et al. |
| 5,867,339 A | 2/1999 | Panish et al. |
| 5,890,278 A | 4/1999 | Van Kesteren |
| 5,909,346 A | 6/1999 | Malhotra et al. |
| 5,920,447 A | 7/1999 | Sakata et al. |
| 5,923,272 A | 7/1999 | Albrecht et al. |
| 5,930,065 A | 7/1999 | Albrecht et al. |
| 5,940,238 A | 8/1999 | Nayak et al. |
| 5,966,264 A | 10/1999 | Belser et al. |
| 5,966,632 A | 10/1999 | Chen et al. |
| 5,973,874 A | 10/1999 | Panish et al. |
| 5,982,711 A | 11/1999 | Knowles et al. |
| 5,995,315 A | 11/1999 | Fasen |
| 6,005,737 A | 12/1999 | Connolly et al. |
| 6,018,444 A | 1/2000 | Beck et al. |
| 6,021,013 A | 2/2000 | Albrecht et al. |
| 6,025,970 A | 2/2000 | Cheung |
| 6,031,673 A | 2/2000 | Fasen et al. |
| 6,034,835 A | 3/2000 | Serrano |
| 6,075,678 A | 6/2000 | Saliba |
| 6,081,401 A | 6/2000 | Varian |
| 6,088,184 A | 7/2000 | Hu |
| 6,090,507 A | 7/2000 | Grenon et al. |
| 6,111,719 A | 8/2000 | Fasen |
| 6,118,630 A | 9/2000 | Argumedo |
| 6,130,804 A | 10/2000 | Panish et al. |
| 6,141,174 A | 10/2000 | Judge et al. |
| 6,156,487 A | 12/2000 | Jennison et al. |
| 6,163,421 A | 12/2000 | Shinpuku et al. |
| 6,163,436 A | 12/2000 | Sasaki et al. |
| 6,165,649 A | 12/2000 | Grenon et al. |
| 6,169,640 B1 | 1/2001 | Fasen |
| 6,190,836 B1 | 2/2001 | Grenon et al. |
| 6,222,698 B1 | 4/2001 | Barndt et al. |
| 6,229,669 B1 | 5/2001 | Beck et al. |
| 6,236,525 B1 | 5/2001 | Cates et al. |
| 6,236,538 B1 | 5/2001 | Yamada et al. |
| 6,269,533 B2 | 8/2001 | Dugas |
| 6,275,350 B1 | 8/2001 | Barndt |
| 6,282,051 B1 | 8/2001 | Albrecht et al. |
| 6,307,718 B1 | 10/2001 | Kasetty |
| 6,320,719 B1 | 11/2001 | Albrecht et al. |
| 6,433,949 B1 | 8/2002 | Murphy et al. |
| 6,445,550 B1 | 9/2002 | Ishi |
| 6,462,904 B1 | 10/2002 | Albrecht et al. |
| 6,469,867 B2 | 10/2002 | Saliba |

| | | |
|---|---|---|
| 6,496,328 B1 | 12/2002 | Dugas |
| 6,542,325 B1 | 4/2003 | Molstad et al. |
| 6,545,837 B1 | 4/2003 | Tran |
| 6,574,066 B1 | 6/2003 | Stubbs et al. |
| 6,590,729 B1 | 7/2003 | Akagi et al. |
| 6,622,490 B2 | 9/2003 | Ingistov |
| 6,635,404 B1 | 10/2003 | Choi et al. |
| 6,650,496 B2 | 11/2003 | Nozieres et al. |
| 6,678,116 B2 | 1/2004 | Dugas |
| 6,700,729 B1 | 3/2004 | Beck et al. |
| 6,721,126 B1 | 4/2004 | Bui et al. |
| 6,744,594 B2 | 6/2004 | Denison et al. |
| 6,754,026 B1 | 6/2004 | Koski |
| 6,778,359 B1 | 8/2004 | Iwama |
| 6,781,778 B1 | 8/2004 | Molstad et al. |
| 6,795,246 B2 | 9/2004 | Yano et al. |
| 6,798,608 B2 | 9/2004 | Chliwnyj et al. |
| 6,801,383 B2 | 10/2004 | Zweighaft et al. |
| 6,801,391 B2 | 10/2004 | Sugawara et al. |
| 6,831,805 B2 | 12/2004 | Chliwnyj et al. |
| 6,842,305 B2 | 1/2005 | Molstad et al. |
| 6,865,050 B2 | 3/2005 | Nakao et al. |
| 6,873,487 B2 | 3/2005 | Molstad |
| 6,879,457 B2 | 4/2005 | Eaton et al. |
| 6,894,869 B2 | 5/2005 | Dugas |
| 6,943,987 B1 | 9/2005 | Raymond et al. |
| 6,947,247 B2 | 9/2005 | Schwarz et al. |
| 6,947,256 B2 | 9/2005 | Biskeborn et al. |
| 6,950,277 B1 | 9/2005 | Nguy et al. |
| 6,963,467 B2 | 11/2005 | Bui et al. |
| 6,970,312 B2 | 11/2005 | Yip et al. |
| 6,987,648 B2 | 1/2006 | Dugas |
| 6,989,950 B2 | 1/2006 | Ohtsu |
| 6,989,960 B2 | 1/2006 | Dugas |
| 7,009,810 B2 | 3/2006 | Dugas |
| 7,072,133 B1 | 7/2006 | Yip et al. |
| 7,106,544 B2 | 9/2006 | Dugas et al. |
| 7,119,976 B2 | 10/2006 | Biskeborn et al. |
| 7,130,140 B1 | 10/2006 | Boyer |
| 7,130,152 B1 | 10/2006 | Raymond et al. |
| 7,142,388 B2 | 11/2006 | Tateishi et al. |
| 7,170,702 B2 | 1/2007 | Ohtsu |
| 7,190,551 B2 | 3/2007 | Suda |
| 7,196,870 B2 | 3/2007 | Dugas |
| 7,206,170 B2 | 4/2007 | Yip |
| 7,218,476 B2 | 5/2007 | Dugas |
| 7,224,544 B2 | 5/2007 | Takano et al. |
| 7,283,317 B2 | 10/2007 | Dugas et al. |
| 7,301,716 B2 | 11/2007 | Dugas et al. |
| 7,355,805 B2 | 4/2008 | Nakao et al. |
| 7,426,093 B2 | 9/2008 | Dugas |
| 7,450,341 B2 | 11/2008 | Dugas et al. |
| 7,511,908 B2 | 3/2009 | Winarski |
| 7,515,374 B2 | 4/2009 | Nakao |
| 7,525,761 B2 | 4/2009 | Dugas |
| 7,639,448 B2 | 12/2009 | Haustein |
| 7,679,858 B2 | 3/2010 | Winarski et al. |
| 7,710,675 B2 | 5/2010 | Dugas et al. |
| 7,773,340 B2 | 8/2010 | Dugas |
| 7,948,705 B2 * | 5/2011 | Dugas .......................... 360/75 |
| 2001/0003862 A1 | 6/2001 | Dugas |
| 2001/0045005 A1 | 11/2001 | Dugas |
| 2002/0034042 A1 | 3/2002 | Hungerford et al. |
| 2002/0058204 A1 | 5/2002 | Khojasteh et al. |
| 2002/0061465 A1 | 5/2002 | Hasegawa et al. |
| 2002/0125289 A1 | 9/2002 | Huetter |
| 2002/0171974 A1 | 11/2002 | Dugas |
| 2002/0177066 A1 | 11/2002 | Song et al. |
| 2003/0016446 A1 | 1/2003 | Yano |
| 2003/0039063 A1 | 2/2003 | Dugas |
| 2003/0048563 A1 | 3/2003 | Magnusson |
| 2003/0093894 A1 | 5/2003 | Dugas |
| 2003/0099057 A1 | 5/2003 | Molstad |
| 2003/0099059 A1 | 5/2003 | Nakao |
| 2003/0137768 A1 | 7/2003 | Chliwnyj et al. |
| 2003/0151844 A1 | 8/2003 | Eaton et al. |
| 2004/0001275 A1 | 1/2004 | Chliwnyj et al. |
| 2004/0109261 A1 | 6/2004 | Dugas |
| 2004/0145827 A1 | 7/2004 | Biskeborn et al. |
| 2004/0174628 A1 | 9/2004 | Schwarz et al. |
| 2005/0007323 A1 | 1/2005 | Appelbaum et al. |
| 2005/0052779 A1 | 3/2005 | Nakao et al. |
| 2005/0052783 A1 | 3/2005 | Suda |
| 2005/0099713 A1 | 5/2005 | Molstad et al. |
| 2005/0099715 A1 | 5/2005 | Yip et al. |
| 2005/0152066 A1 | 7/2005 | Yip |
| 2005/0168869 A1 | 8/2005 | Dugas et al. |
| 2005/0180040 A1 | 8/2005 | Dugas et al. |
| 2005/0219734 A1 | 10/2005 | Rothermel et al. |
| 2005/0254170 A1 | 11/2005 | Dugas et al. |
| 2005/0259364 A1 | 11/2005 | Yip |
| 2005/0275968 A1 | 12/2005 | Dugas |
| 2006/0061906 A1 | 3/2006 | Dugas |
| 2006/0126207 A1 | 6/2006 | Johnson et al. |
| 2009/0097155 A1 | 4/2009 | Dugas |
| 2009/0262452 A1 | 10/2009 | Dugas |
| 2010/0002335 A1 | 1/2010 | Dugas |

FOREIGN PATENT DOCUMENTS

| | | |
|---|---|---|
| EP | 0 407 244 | 1/1991 |
| EP | 0 690 442 | 1/1996 |
| EP | 0 328 104 | 8/1998 |
| EP | 0 913 813 A2 | 5/1999 |
| JP | 53-007219 | 1/1978 |
| JP | 58146011 | 8/1983 |
| JP | 59-008833 | 1/1984 |
| JP | 60-078347 | 4/1985 |
| JP | 61090318 A | 5/1986 |
| JP | 61-151667 | 6/1986 |
| JP | 61-174630 | 8/1986 |
| JP | 61-291074 | 12/1986 |
| JP | 01-064104 | 3/1989 |
| JP | 02-094019 | 4/1990 |
| JP | 02-097659 | 4/1990 |
| JP | 02-288530 | 10/1990 |
| JP | 03-078104 | 4/1991 |
| JP | 03-198210 | 8/1991 |
| JP | 03-269804 | 12/1991 |
| JP | 03-324223 | 12/1991 |
| JP | H04-090110 | 3/1992 |
| JP | 04-091317 | 4/1992 |
| JP | 4103009 | 4/1992 |
| JP | 06-035569 | 3/1994 |
| JP | 06-089412 | 3/1994 |
| JP | 07-187016 | 7/1994 |
| JP | 06-243429 | 9/1994 |
| JP | 06-242827 | 10/1994 |
| JP | 06-301926 | 10/1994 |
| JP | 06-333210 | 12/1994 |
| JP | 08339519 A | 12/1996 |
| JP | 09-138912 | 5/1997 |
| JP | 09-219006 | 8/1997 |
| JP | 09-219010 | 8/1997 |
| JP | 10-011714 | 1/1998 |
| JP | 10-198918 | 7/1998 |
| JP | H10-269526 | 10/1998 |
| JP | 11-039623 | 2/1999 |
| JP | 11-045402 | 2/1999 |
| JP | 11-242803 | 9/1999 |
| JP | 10-334435 | 12/1999 |
| JP | 11-353609 | 12/1999 |
| JP | 2002-308945 | 10/2002 |
| JP | A-2003-168203 | 6/2003 |
| JP | 2005-063623 | 3/2005 |
| WO | WO 97/05603 | 2/1997 |
| WO | WO 97/40493 | 10/1997 |
| WO | WO 99/50834 | 10/1999 |
| WO | WO 99/67777 | 12/1999 |
| WO | WO 00/51109 | 8/2000 |
| WO | WO 01/50463 | 7/2001 |

OTHER PUBLICATIONS

Yiqun, Li, et al. "Magnetic Properties and Crystal Structure of FeTaAIN Soft Magnetic Materials for MIG Head", (Abstract).

Albrecht, Thomas et al. "Time-Based, Track-Following Servos for Linear tape Drives", Data Storage, Oct. 1997.

Monigle, William C. "FIBs Probe and Fix Semiconductor Problems", Test & Measurement World, May 1988.

Fujiii, S. et al., "A Planarization technology using a bias-deposited dielectric film and an etch-backprocess", IEEE Transactions on, vol. 35, Issue 11, Nov. 1988, pp. 1829-1833.

McDermott, Michael, "Head Makers Discovery Focused Ion Beams", Data Storage, Mar. 1998.

R.C. Barrett, et al., "Timing based Track-Following Servo for Linear Tape Systems", IEEE Transactions on Magnetics, vol. 34, No. 4, Jul. 1998, pp. 1872-1877.

Dee et al., "Advanced Multi-Track Tape Head for High Performance Tape Recording Application", Mar. 1999, IEEE Transactions Magnetics, vol. 35, No. 2, pp. 712-717.

File materials for development of a Servo Writer Head from Advanced Research Corporation, Seagate Technology, Inc., and Design & Test Technology, Inc., said documents' dates ranging from Feb. 1998-Jun. 1999.

IBM TDB "Hybrid Thin R W Head with Bonding by Laser Beam", vol. 19, Issue No. 2, pp. 681-682 (Jul. 1976).

\* cited by examiner

US 8,254,052 B2

METHOD OF MAKING A MULTI-CHANNEL TIME BASED SERVO TAPE MEDIA

CROSS-REFERENCE TO RELATED APPLICATIONS

This application is a continuation of U.S. application Ser. No. 12/430,653, filed Apr. 27, 2009, now U.S. Pat. No. 7,948,705,which is a continuation of U.S. application Ser. No. 11/842,692,filed Aug. 21, 2007, now U.S. Pat. No. 7,525,761, which is a continuation of U.S. application Ser. No. 11/126,956, filed May 11, 2005, now abandoned, which is a continuation of U.S. application Ser. No. 10/160,397, filed May 31, 2002, now U.S. Pat. No. 6,894,869, which is a continuation of U.S. application Ser. No. 09/475,420, filed Dec. 20, 199, now U.S. Pat. No. 6,496,328.

FIELD OF THE INVENTION

This invention relates generally to magnetic recording heads and more particularly to a structure for a ferrite driven, surface thin-film magnetic recording head wherein a substantial portion of the ferrite core has been replaced with a magnetically impermeable material and an optimal back-bar arrangement which reduces the inductance and increases the efficiency of the head.

BACKGROUND OF THE INVENTION

While a variety of data storage mediums are available, magnetic tape remains a preferred forum for economically storing large amounts of data. In order to facilitate the efficient use of this media, magnetic tape will have a plurality of data tracks extending in a transducing direction of the tape. Once data is recorded onto the tape, one or more data read heads will read the data from those tracks as the tape advances, in the transducing direction, over the read head. It is generally not feasible to provide a separate read head for each data track, therefore, the read head(s) must move across the width of the tape (in a translating direction), and center themselves over individual data tracks. This translational movement must occur rapidly and accurately.

In order to facilitate the controlled movement of a read head across the width of the media, a servo control system is generally implemented. The servo control system consists of a dedicated servo track embedded in the magnetic media and a corresponding servo read head (which is usually one of the standard read heads, temporarily tasked to servo functions) which correlates the movement of the data read heads.

The servo track contains data, which when read by the servo read head is indicative of the relative position of the servo read head with respect to the magnetic media in a translating direction. In one type of traditional amplitude based servo arrangement, the servo track was divided in half. Data was recorded in each half track, at different frequencies. The servo read head was approximately as wide as the width of a single half track. Therefore, the servo read head could determine its relative position by moving in a translating direction across the two half tracks. The relative strength of a particular frequency of servo signal would indicate how much of the servo read head was located within that particular half track. The trend toward thinner and thinner magnetic tape layers causes amplitude modulation problems with this and other amplitude based heads. That is, as the thickness of the magnetic layer decreases, normal variations on the surface represent a much larger percentage variation in the magnetic layer, which will dramatically affect the output signal.

Recently, a new type of servo control system was created which allows for a more reliable positional determination by reducing the amplitude based servo signal error traditionally generated by debris accumulation, media thickness non-uniformity and head wear. U.S. Pat. No. 5,689,384, issued to Albrecht et al. on Nov. 19, 1997, introduces the concept of a timing based servo pattern on a magnetic recording head.

In a timing based servo pattern, magnetic marks (transitions) are recorded in pairs within the servo track. Each mark of the pair will be angularly offset from the other. For example, a diamond pattern has been suggested and employed with great success. The diamond will extend across the servo track in the translating direction. As the tape advances, the servo read head will detect a signal or pulse generated by the first edge of the first mark. Then, as the head passes over the second edge of the first mark, a signal of opposite polarity will be generated. Now, as the tape progresses no signal is generated until the first edge of the second mark is reached. Once again, as the head passes the second edge of the second mark, a pulse of opposite polarity will be generated. This pattern is repeated indefinitely along the length of the servo track. Therefore, after the head has passed the second edge of the second mark, it will eventually arrive at another pair of marks. At this point, the time it took to move from the first mark to the second mark is recorded. Additionally, the time it took to move from the first mark (of the first pair) to the first mark of the second pair is similarly recorded.

By comparing these two time components, a ratio is determined. This ratio will be indicative of the position of the read head within the servo track, in the translating direction. As the read head moves in the translating direction, this ratio will vary continuously because of the angular offset of the marks. It should be noted that the servo read head is relatively small compared to the width of the servo track. Ideally, the servo head will also be smaller than one half the width of a written data track. Because position is determined by analyzing a ratio of two time/distance measurements, taken relatively close together, the system is able to provide accurate positional data, independent of the speed (or variance in speed) of the media.

Of course, once the position of the servo read head is accurately determined, the position of the various data read heads can be controlled and adjusted with a similar degree of accuracy on the same substrate. Namely, the various read heads are fabricated on the same substrate with a known spacing between them. Hence knowing the location of one allows for a determination of the location of the remainder of the read heads.

When producing magnetic tape (or any other magnetic media) the servo track is generally written by the manufacturer. This results in a more consistent and continuous servo track, over time. To write the timing based servo track described above, a magnetic recording head bearing the particular angular pattern as its gap structure, must be utilized. As it is advantageous to minimize the amount of tape that is dedicated to servo tracks, to allow for increased data storage, and it is necessary to write a very accurate pattern, a very small and very precise servo recording head element must be fabricated.

Two types of servo recording heads having a timing based pattern are known. The first is a pure thin film head, such as that disclosed by Aboaf et al. in U.S. Pat. No. 5,572,392, issued on Nov. 5, 1996. With a pure thin film head, all of the components of the head are created from layering different materials, as thin films, on an inert substrate. For example, the magnetic core, the windings and any barrier materials are formed by producing thin films. Such a head has very low inductance, however, it is extremely difficult to manufacture. To date, pure thin film heads are generally not utilized for time based servo heads and are not seen as a practical way to produce such a magnetic head.

A very different type of recording head is taught by Albrecht et al. in the '384 patent. This second type of head is referred to herein as a surface film or surface thin film head and is illustrated as 100, in FIG. 18. The surface film head 100 includes two C-shaped ferrite blocks 110, 112 that are bonded to a ceramic member 114 that extends the entire width of the head 100. A surface is then polished flat or contoured and prepared for this film deposition. A magnetically permeable thin film 116 is deposited over an upper surface of the ferrite blocks 110, 112 and the exposed upper portion of the ceramic member 114. The thin film 116 is shown much larger than it would actually be, respective to the other elements. Gaps 118 are formed in the thin film 116, in an appropriate timing based pattern. Windings 120 are wrapped and are electrically driven to drive flux around the ferrite core and through the thin film 116 (in the direction of arrow A). The flux leaks from the gaps 118 and writes media passing over it.

Such a surface film head has a high inductance due to the large volume of ferrite forming the core and a high reluctance "back-gap", due to the separation of the ferrite block 110, 112 by the ceramic member 114, on the underside of the head (i.e., opposite the thin film 116). The size and dimensions of the head are determined by the end use characteristics. For example, the width of the head 100 is defined by the width of the media; i.e., a head that is 19 mm wide is appropriate to support a tape that is 12.5 mm wide. The ceramic member 114 must be thick enough to allow the proper patterns 118 to be located above it and is approximately 0.012" in the known versions of the Albrecht et al. head, produced by IBM. The length of the head must be sufficient to support the media as it travels over the tape bearing surface and the depth (especially of the ferrite cores) must be sufficient to allow appropriate windings to be attached and to allow the head to be securely fixed in a head mount.

With the surface film head, flux is forced to travel through a magnetically permeable thin film that bridges a generally magnetically impermeable barrier between sections of the core. The writing gap is located within this thin film and the magnetic flux is expected to leak from this gap and write the media. The width of the ferrite is much larger than the sum of the channel widths. Hence, there is a large amount of unnecessary ferrite inductance. In other words, as a result of the relatively large amount of extraneous ferrite, an unnecessarily high amount of inductance is created. Therefore, to produce a relatively small amount of flux leakage through a small gap in the thin film, very high levels of current are required to generate sufficient magnetic flux throughout the relatively large core. This requires greater write current from the drive circuitry, lowers the frequency response of the head, and increases the rise time of the writing pulses from the head.

The thin film layer bridges a "gap" between the ferrite sections of the substrate, at one end of the head. This is, of course, the writing end of the head. This gap, referred to as the "sub-gap" by the present inventor to distinguish it from the writing gaps in the thin film, is formed from and defined by the ceramic insert. As discussed above, the ceramic insert extends through the entire height of the write head. This forms a very large "back-gap" in a portion of the head opposite the thin film layer. This back-gap, in some prior recording heads, is a portion of the head where the magnetic flux must travel through the ceramic member in order to complete the magnetic circuit. Ultimately, this forms a barrier which hampers the magnetic flux; in other words the reluctance through the back-gap is relatively high and again, the head must be driven harder to compensate. This is only really problematic in heads having a larger back-gap with respect to the writing gap, such as in Albrecht et al. Various other magnetic heads, video for example, will have a back-gap length equal to the writing gap length. In addition, the video core back-gap is made very tall, thus increasing its area and reducing the back-reluctance. Techniques used to reduce the reluctance of video recording heads are not applicable to sub-gap driven heads.

Such problems are intensified with heads having multiple writing gaps, or channels. As shown in FIG. 18, a single core is driven and simultaneously writes multiple channels (each of the writing gaps 118 forms a separate channel). In order to do so, a multi-channel head will necessarily have to be wider than a single channel head. This in turn necessitates that the core become larger. All of this leads to a head having a larger amount of magnetically permeable material through which a predetermined amount of magnetic flux must flow while attempting to consistently and simultaneously write multiple channels. In other words, excess and unused ferrite material is provided in between the channels which unnecessarily increases the overall inductance of the head.

Therefore, there exists a need to provide an efficient multi-channel timing based head having a lower overall inductance, a lower reluctance through the back-gap, a higher frequency response, and greater efficiency. Furthermore, there exists a need to provide such a multi-channel head with the ability to individually and separately drive and control each channel.

SUMMARY OF THE INVENTION

The present invention relates to a low inductance, high efficiency sub-gap, surface thin film magnetic recording head and a method of fabricating the same.

A substrate consisting of a ceramic member, glass bonded between a pair of ferrite blocks is prepared. After the substrate is created, it is diced to form a base from which a plurality of columns extend. The number of columns will correspond to the eventual number of channels in a completed recording head. A ceramic block is prepared which corresponds to the dimensions of the substrate. Channels or notches are cut into the ceramic block so that the substrate columns engage them in a male/female relationship. The channels allow for the entirety of the column to be accepted within the channel so that the base of the substrate flushly abuts the corresponding base of the ceramic block. The ceramic block is then adhered to the substrate. In particular, the columns of the substrate are glass bonded to the interior of the channels in the ceramic block, thus forming a head member.

The top and bottom of the head member are then cut or ground to produce a uniform block of alternating ceramic portions and substrate columns wherein each substrate column includes a sub-gap. A sufficient amount of the head member is cut or ground so that the substrate columns extend through the entire height of the remaining portion of the head member. During this process, the upper portion of the head member can be appropriately radiused, as it is this section which will become the tape bearing surface of the writing head.

If desired, air bleed slots can be cut into the head member, perpendicular to the direction of tape travel. On top of the head member, a magnetically permeable thin film is deposited, preferably by a sputtering process. It is within this thin film that the writing gaps will be produced. As such, any known process of forming these gaps in the thin film is acceptable. To the extent that various plating techniques will be utilized, those gaps would be formed accordingly.

At this point, a back-bar is attached to the head member. The back-bar is formed from an appropriate magnetically permeable material, such as ferrite. The back-bar is provided with a structure so that it may be wrapped with an appropriate winding to produce a coil. The back-bar can be formed in a wide variety of configurations. In the simplest form, a single winding is provided around all of the back-bars, and when driven, will engage each of the channels simultaneously. Alternatively, a separate winding is provided for each channel, thus allowing each channel to be separately driven and controlled. Furthermore, any intermediary combination is allowable. That is, any particular combination of channels can be tied together. When the channels are timed and driven independently, sections of the magnetically permeable thin film must be removed between the channels. This prevents magnetic flux from passing from one channel to another through the thin film layer. It is the prevention of this cross talk which allows the multi-channel head to have its channels driven independently in time or phase. To produce such isolation, sections of the thin film can be removed by ion milling, wet chemical etching, or by any other known process. Other techniques such as selective plating or selective spattering could also be used.

In one embodiment, the present recording head provides a magnetically impermeable barrier between each channel so that actuation of one channel will in no way interfere with any other channel in the head. Hence, a significant portion of the magnetic volume of the head laying between each channel has been replaced with a ceramic material. Furthermore, in the back-gap area a back-bar has been incorporated. Utilization of the back-bar serves to reduce the reluctance of the back-gap and increase the efficiency of the head. Due to the reduction in overall volume of the ferrite core in the interchannel area, the head has a lower total inductance and is therefore more easily driven. Due to the lower inductance per channel, the frequency response of the head can be greatly increased. This increased response time translates into faster current rise times for the output flux signal generated. This ultimately leads to sharper written transitions when the head is used to apply servo patterns to magnetic media. It also allows for specific patterns to be accurately and quickly written by individually controlling and driving the various channels of the head.

In another aspect of the present invention, the magnetically permeable thin film layer is optimally configured to complete a magnetic circuit for each channel, while limiting mechanical interference of the film with the air bleed slots. Consideration must be given to the minimal requirements for completing the circuit and the engagement of the media against a head having a non-planar surface while minimizing the complexity of providing the air bleed slots. In addition, when working with components of this scale, consideration must be given to the etching or milling technique utilized to impart and define the thin film layer so that mechanical shear or peeling of the film is not induced by the tape's motion.

It is an object of the present invention to provide a multi-channel magnetic surface film servo write head having a reduced volume of magnetically permeable material.

It is a further object of the present invention to reduce the reluctance of the back-gap portion of the magnetic recording head.

It is another object of the present invention to provide a magnetic recording head having multiple channels wherein each channel is separately and individually controllable.

It is still another object of the present invention to provide a method of making a multi-channel head wherein each channel is isolated from the next.

It is yet another object of the invention to provide a highly efficient multi-channel recording head having a relatively high frequency response suitable for use as a servo write head.

DETAILED DESCRIPTION OF THE PREFERRED EMBODIMENT

Figure 1:
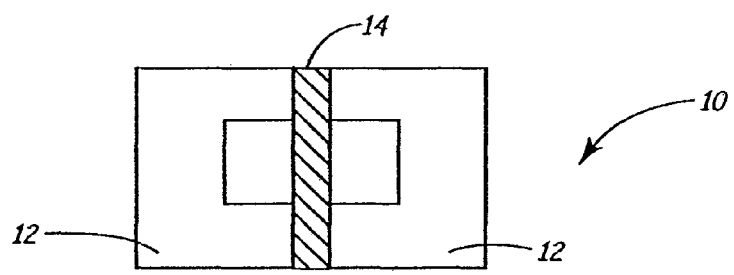
FIG. 1 is a side planar view of a substrate composed of ferrite blocks glass bonded to a ceramic member.
Figure 2:
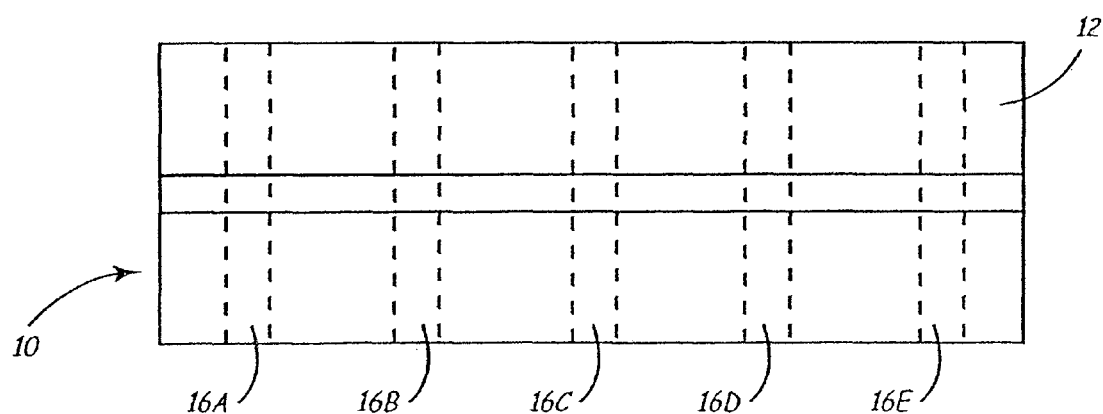
FIG. 2 is a top planar view of the substrate shown in FIG. 1.

The present invention is a multi-channel head and method of making the same. Referring to FIG. 1, a substrate 10 is created by glass bonding two C-shaped ferrite blocks 12 to a medially disposed ceramic member 14. The sizes, shapes and relative proportions of the ferrite blocks 12 and ceramic member 14 may vary as dictated by the desired parameters of the completed recording head. Furthermore, the choice of materials may also vary so long as blocks 12 remain magnetically permeable while member 14 remains substantially magnetically impermeable. FIG. 2 is a top view of the substrate 10.

Figure 3:
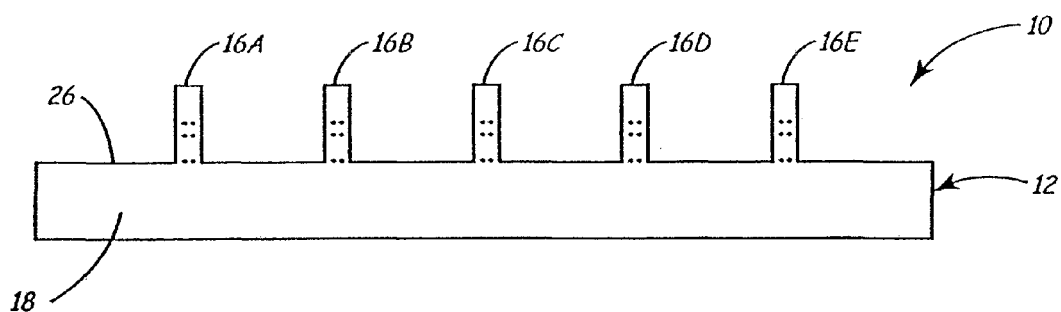
FIG. 3 is a side view of the substrate of FIG. 1, diced into a plurality of columns.
Figure 4:
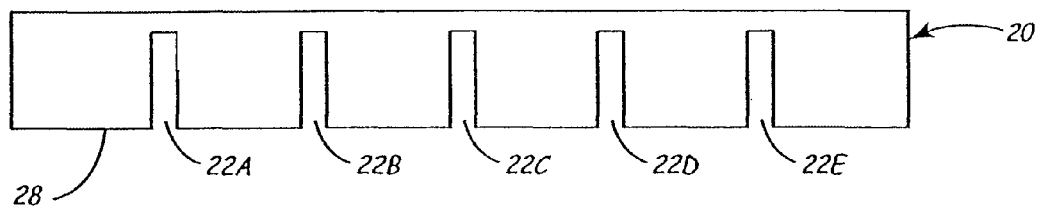
FIG. 4 is a side view of a ceramic block having a plurality of notches.

Referring to FIG. 3, substrate 10 is diced so as to form a plurality of columns 16A-16E which remain adhered to base 18. Columns 16A-16E are also shown by the dashed lines in FIG. 2, which illustrates how each column will have a ceramic portion (sub-gap) bonded between two ferrite poles. The dashed lines are merely illustrative of future columns, as the substrate 10 in FIG. 2 has yet to be diced. As shown is FIG. 4, a ceramic block 20, or slider, is cut to form a plurality of channels or notches 22A-22E. The ceramic block 20 can be formed from barium titanate, or any other suitable magnetically impermeable material. The notches 22A-22E are cut to correspond with columns 16A-16E. As such, the relative size and shape of the columns 16A-16E and the notches 22A-22E should correspond; beyond that the selection of size and shape will simply depend on the desired final parameters of the completed magnetic head.

Figure 5:
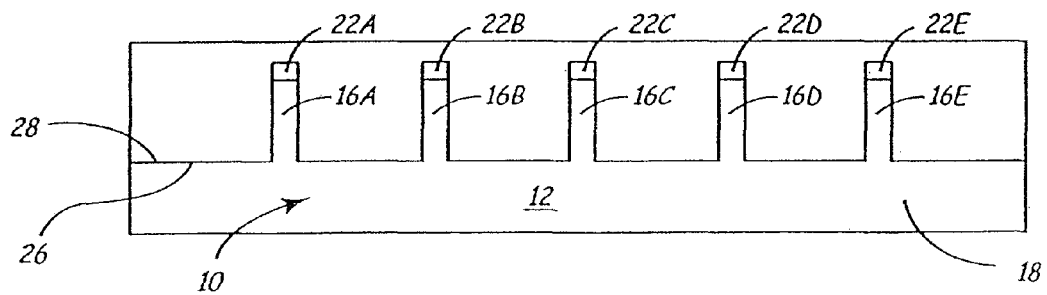
FIG. 5 is a side view of the ceramic block and the substrate bonded together.

As illustrated in FIG. 5, substrate 10 is mated with ceramic block 20. More specifically, columns 16A-16E are inserted into notches 22A-22E until the upper surface 26 of the base 18 of substrate 10 flushly meets the lower surface 28 of ceramic block 20. Subsequently, substrate 10 is adhered to ceramic block 20. This can be accomplished in any known way. In its most preferred form, substrate 10 is glass bonded to ceramic block 20. To accomplish this, the substrate 10 is clamped or otherwise secured to ceramic block 20, as shown in FIG. 5. Glass rods are placed into the various notches 22A-22E, in a space left by the columns 16A-16E. The assembly is then heated to a temperature sufficient to melt the glass rods. This causes the melted glass to wick along the abutting sides of the columns 16A-16E and the notches 22A-22E. Once allowed to cool, the glass hardens and bonds the members together.

Figure 6:
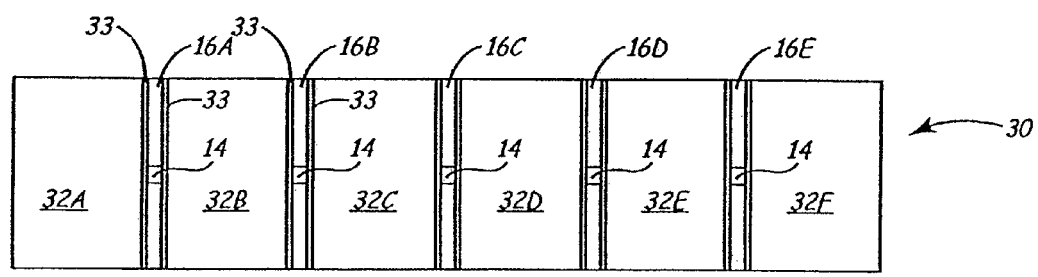
FIG. 6 is a top view of the bonded substrate after the top and bottom have been cut or ground.
Figure 7:
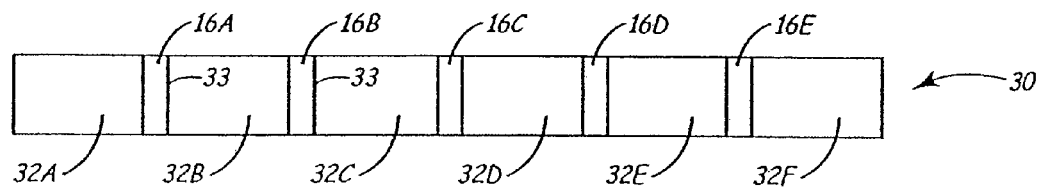
FIG. 7 is a side view of the bonded substrate after the top and bottom have been cut or ground.

The top and the bottom of this assembly are then cut or ground away to arrive at the head substrate 30 shown in FIGS. 6 and 7. From a top view and moving left to right (as illustrated), head substrate 30 has a ceramic portion 32A, which is a remainder of ceramic block 20. A bead of glass 33 bonds ceramic portion 32A to ferrite column 16A. Medially dissecting ferrite column 16A is a portion of ceramic member 14, which is likewise glass bonded to ceramic portion 32A. It is to be understood that the portion of the non-magnetic ceramic member 14 extends through the entire length of the remaining ferrite column 16A, thus dividing it into two magnetic poles. Glass bonds 33 likewise join ceramic portion 32B between ferrite columns 16A and 16B. This pattern is repeated across the head, with the number of ferrite columns 16A-16E, representing the eventual number of channels in the completed write head. FIG. 7 is a side view of head substrate 30 and illustrates that the ferrite columns 16A-16E (with included sections of ceramic member 14, not visible in this view) forming a sandwich pattern with the ceramic portions 32A-32F. As illustrated (in FIG. 4), the notches 22A-22E extend through the entire width of the ceramic block 20. Thus, the ferrite columns 16A-16E are visible from a side view (FIG. 7).

Figure 8:
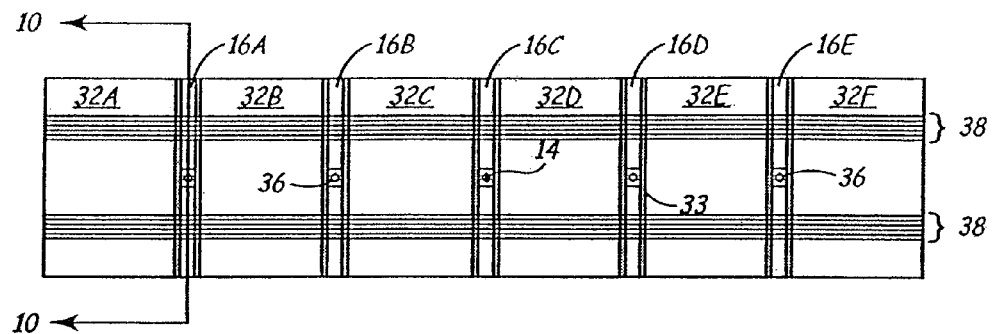
FIG. 8 is a top view of a head assembly.
Figure 9:
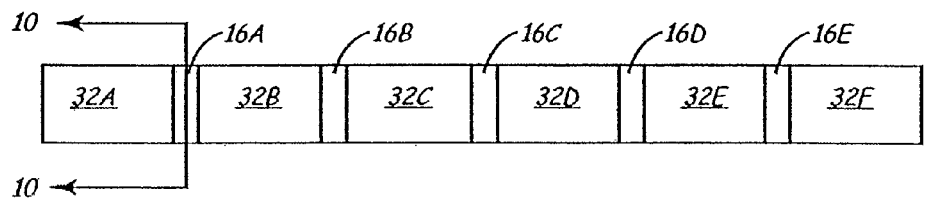
FIG. 9 is a side view of a head assembly.

Head substrate 30 is now ready to be formed into a completed magnetic recording head. To summarize the remainder of the fabrication, a slight radius or curvature is caused on the upper surface of the head substrate 30. This step could occur when removing the top section from the bonded substrate 10 and ceramic block 20, or it could be done at this stage as a separate operation. The curvature is imparted to the head substrate 30 because its upper-surface will become the tape bearing surface of the completed head. This curvature facilitates smooth contact with the media under tension. A magnetically permeable thin film layer 34 is deposited across the upper surface of the head substrate 30. Writing gaps 36 (FIG. 8) are caused to be formed in this thin film 34, aligned with the visible portion of ceramic member 14, or in other words, above the sub-gap. Alternatively, the head contour could be finished into a generally flat surface having integrated negative pressure channels. The use of these various contours is known in the art.

Either prior to depositing the thin film or after, air bleed slots 38 may be cut into head substrate 30 along the tape bearing surface as is known in the art. Once head substrate 30 has been fabricated into a recording head, magnetic tape will move across its upper surface in a transducing direction. Therefore, the air bleed slots 38 are cut perpendicular to the transducing direction. As the tape moves over the recording head at relatively high speed, air entrainment occurs. That is, air is trapped between the lower surface of the tape and the upper surface of the recording head. As the tape moves over the recording head, the first air bleed slot encountered serves to skive off the trapped air. The second and subsequent slots continue this effect, thus serving to allow the tape to closely contact the recording head. As the tape passes over the recording gaps 36, it is also held in place by the other air bleed slots 38 encountered on the opposite side of the gaps 30.

Figure 10:
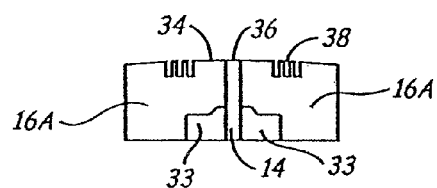
FIG. 10 is an end sectional view taken about line 10-10.
Figure 11:
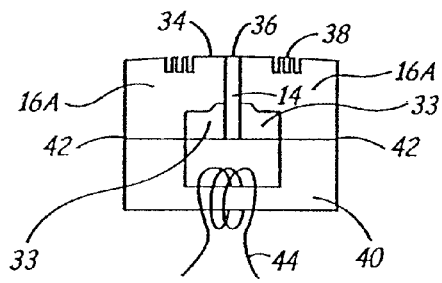
FIG. 11 is an end sectional view taken about line 10-10 and having a back-gap attached.

FIG. 10 is an end, partially sectional view of head substrate 30 taken about line 10-10. This figure illustrates the relationship between the ferrite column 16A and the remaining portion of ceramic member 14. Thin film layer 34 is located on its upper surface and write gaps 36 are located immediately above the portion of ceramic member 14. Air bleed slots 38 are located on opposite side of ceramic member 14 and traverse the whole assembly. FIG. 11 illustrates the back-bar 40 of the present invention as it is attached to ferrite column 16A (again an end, partially sectional view taken about line 10-10). Back-bar 40 is a substantially U-shaped ferrite block which is caused to abut each side of the ferrite column 16A. The shape is chosen to efficiently complete a magnetic circuit and allows a coil 44 to be wound. The back-bar 40 flushly abuts column 16A at is held in place by a bonding agent that is applied at glue points 42. The use of back-bars 40 is advantageous in and of itself. In other words, using the back-bar 40 of the present invention will allow a better surface film head to be produced irrespective of the number of channels formed, or whether the combed structure is utilized to achieve channel separation or to lower stray inductance by reducing the volume of magnetically permeable material in the core.

Figure 18:
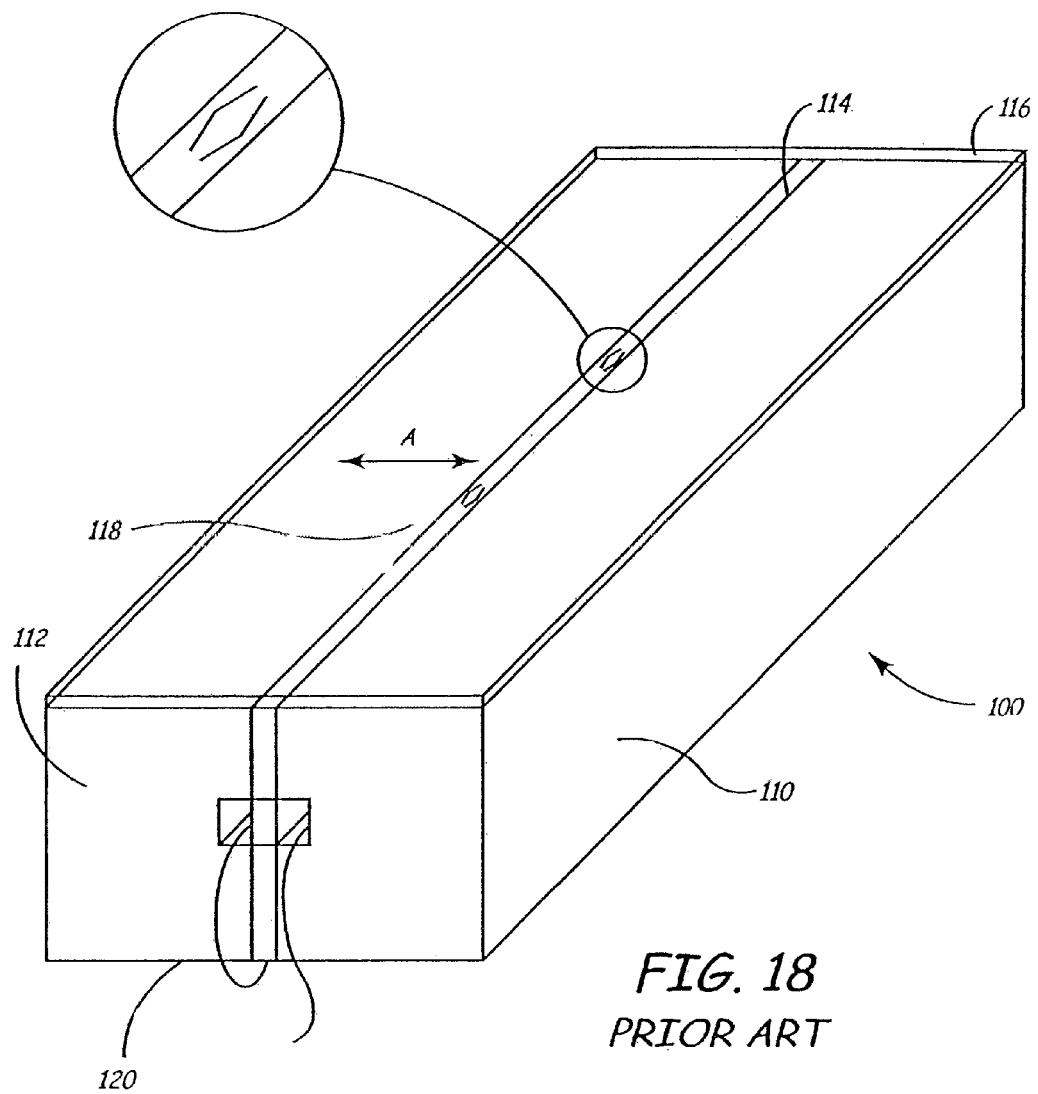
FIG. 18 is a perspective view in a prior art surface thin film magnetic recording head.

Reluctance is proportional to the length and inversely proportional to the area of the barrier. In the prior art surface film recording head (Albrecht et al.), the barrier in the back-gap is defined by the ceramic member 14. The area in question will be defined by the area of contact between the ferrite blocks 110, 112 (FIG. 18) and the ceramic member 114. Length corresponds to the thickness of the ceramic member 114. The thickness of the ceramic member 114, is necessitated by the spatial requirements of the writing gaps 36, and in other words cannot be reduced. In the present invention (FIG. 11) back-bar 40 has been added. The ceramic member 14 has been removed (effectively bypassed) as a flux barrier, but replaced with two much smaller air gap barriers where the back-bar 40 abuts the ferrite column 16A. Again, the barrier in question will be defined by the amount of contact, which is in turn defined by the parameters chosen for the ferrite block 12 (as the back-bar 40 is chosen to correspond). However, the length involved is minuscule as it is defined by the "air gap" created by the abutment of two substantially planar surfaces. As such, the total amount of reluctance in the present back-bar 40 is a very small fraction of the total reluctance in prior art surface film recording heads. This leads to the fabrication of a highly efficient magnetic recording head, as the reluctance of the core has been significantly reduced.

By using the columned or combed structure, the volume of unnecessary or non-useful magnetically permeable materials is greatly reduced, thus decreasing the overall inductance of the head. As such, the frequency response is dramatically increased, thus allowing faster and more accurate writing of data on the media. This is possible because the inducement of sufficient magnetic flux requires substantially less energy input. As such, the rise time of the written pulse is substantially shortened. Thus allowing for a sharper written transition in the media.

The above description relates to the general fabrication of a highly efficient surface thin film magnetic recording head according to the teachings of the present invention. That is, by using the columned (or combed) structure for the body of the head which reduces the overall inductance of the head, and by applying back-bars 40 which reduces the reluctance, an improved head is necessarily formed. In addition there are various other parameters which can be modified to apply the head of the present invention to a wide variety of writing functions. It should be noted that simply using a combed or columned structure in and of itself produces a better, more efficient head. Likewise, the use of back-bars 40 is also independently advantageous and can be utilized on heads having a combed or non-combed core, as efficiency will be increased in both cases.

Figure 12:
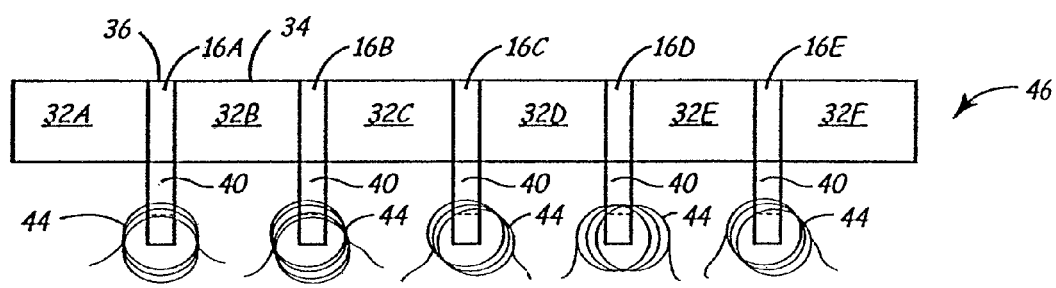
FIG. 12 is a side view of a head assembly having a plurality of back-bars affixed thereto, with coils individually wrapped about each back-bars.
Figure 13:
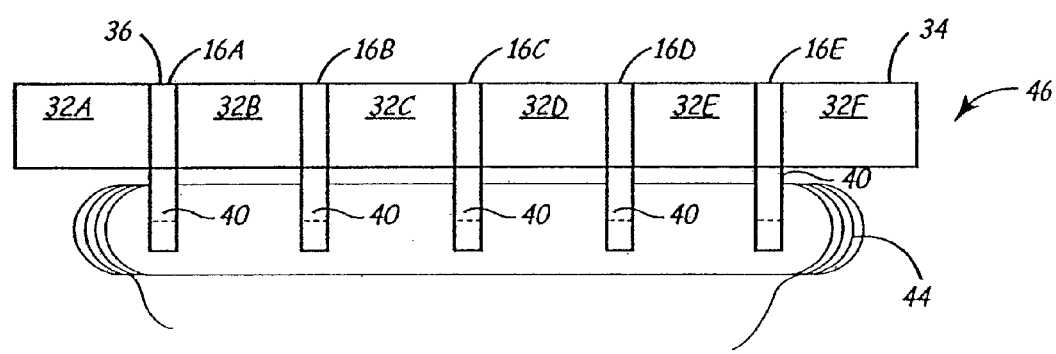
FIG. 13 is a side view of a head assembly having a plurality of back-bars affixed thereto, with a single coil wrapped about all of the back-gaps.

Referring to FIGS. 12 and 13, two substantially completed heads 46 are shown. In FIG. 12, head 46 is a multi-channel head having five independent channels. That is, each channel can be individually triggered and caused to write, independent of the other four channels. To accomplish this, each back-bar 40 has its own coil 44 wrapped about it. In a variety of known ways, these coils 44 can be coupled to a controller and appropriately driven. In FIG. 13, the back-gaps 40 are configured in the same way, however a single coil 44 is coupled to all of the back-gaps 40. In this way, when the coil is energized, the various channels will each write simultaneously. Any intermediate combination is likewise achievable. That is, the individually wrapped coils 44 (FIG. 12) can be tied together, achieving the same result as utilizing a single coil 44. Alternatively, any number or combination of channels can be coupled mechanically or electrically together.

In the preferred embodiment, each back-bar 40 is sized to correspond to an individual channel. As discussed, these back-bars 40 can then be separately wound or wound as a single unit. In addition, a single elongate back-bar 40 could be provided that extends along the entire length of the recording head 46. For example, as shown in FIG. 11, back-bar 40 would extend into the page along the entire length of the head.

An additional advantage of separately driving each channel individually, is the ability to fine tune each channel. As is known in the art and is generally represented by an "I-Sat" curve, each head and more particularly each channel will saturate at different levels of current input (respective to the number of turns in the coil). Therefore, it is desirable to select a particular level of current input to maximize the efficiency and output of each channel. This optimal value often varies from channel to channel. As such, by performing this evaluation for each channel, the optimal current input for each channel can be determined. This information is moot in those heads where all the channels are driven by a single coil. However, with independently driven channels, each channel is driven at its optimal level of current input (ampere-turns).

The head 46 of the present invention has been shown to have five channels. Any number of servo channels could be so fabricated. Five channel or two channel heads seem to be an industry standard for the moment. As the number of servo channels increases, the width of each channel must become narrower in order to prevent excessive depletion of the space available for data.

The choice to produce a multi-channel head having independent channels or one having its channels tied together also affects the application of the thin film 34 to the tape bearing surface of the head 46. More specifically, a multi-channel head having independently driven channels may need to have those channels magnetically isolated from one another to avoid cross talk, depending upon the timing of the information being written.

When cross-talk is not an issue, the surface thin film layer 34 can extend across the entire surface of the head, producing a unitary sheet film. However, the areas of sheet film between the channels may not be well saturated, due to the limited width of the channels and hence the driven core(s), in relation to the overall area of the sheet film. Thus, the areas of sheet film between adjacent channels may provide an undesirable high permeable flux leakage path which limits the amount of signal flux actually passing across the writing gaps 36. Hence, even when cross-talk is not an issue, the preferred embodiment of the low inductance, multi-channel timing based servo head of the present invention will include a separate thin film layer 34 that is dedicated to a single channel and is magnetically isolated from the adjacent channels. The process of providing channel separated thin film 34 areas is discussed below.

In addition, the application of the thin film 34 affects the creation of the air bleed slots 38. Namely, if the slots 38 are cut into the head 46 after the thin film 34 has been deposited, rough corners may be produced which negatively affects the interaction between the head 46 and the media. If the thin film 34 is deposited after the slots are cut, thin film step coverage over the slots becomes yet another issue.

The present invention contemplates a variety of techniques to deal with the above mentioned considerations. The particular technique selected will also depend on the method used to form the writing gaps 36 into the thin film layer 34.

Figure 14:
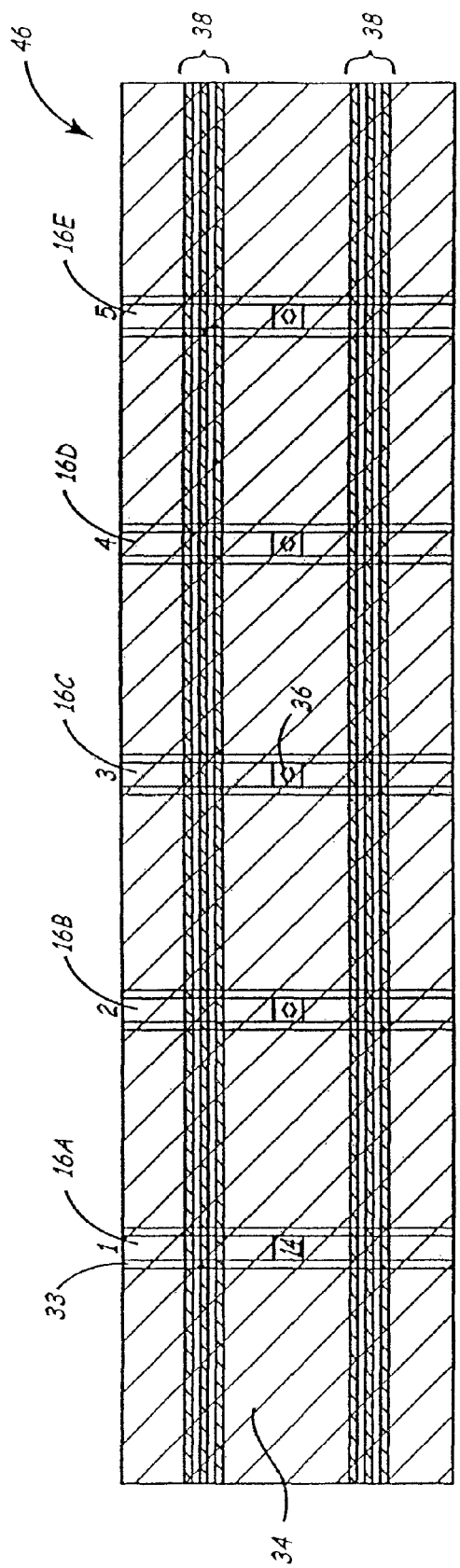
FIG. 14 is a head assembly showing a pattern of thin film.

FIG. 14 represents the simplest head fabrication format. Here, head 46 is a multi-channel head wherein the various channels are all coupled together. Though not shown, the gaps 36 will be patterned into each channel above the ceramic member 14 (i.e., that of FIG. 13). Assuming a staggered pattern is desired, the various gaps 36 would be so arranged. Thin film layer 34 (designated by the hash lines) has been deposited over the entire surface of head 46. As discussed above, this makes the cutting of air bleed slots 38 problematic. However, this problem can be reduced by slitting the heads prior to applying the film. As such, a relatively high quality head 46 can be produced. The advantage of such an arrangement is that the thin film layer 34 provides a uniform tape bearing surface over the entirety of the upper surface of head 46. Conversely, the photolithography becomes more difficult due to the slots.

Figure 15:
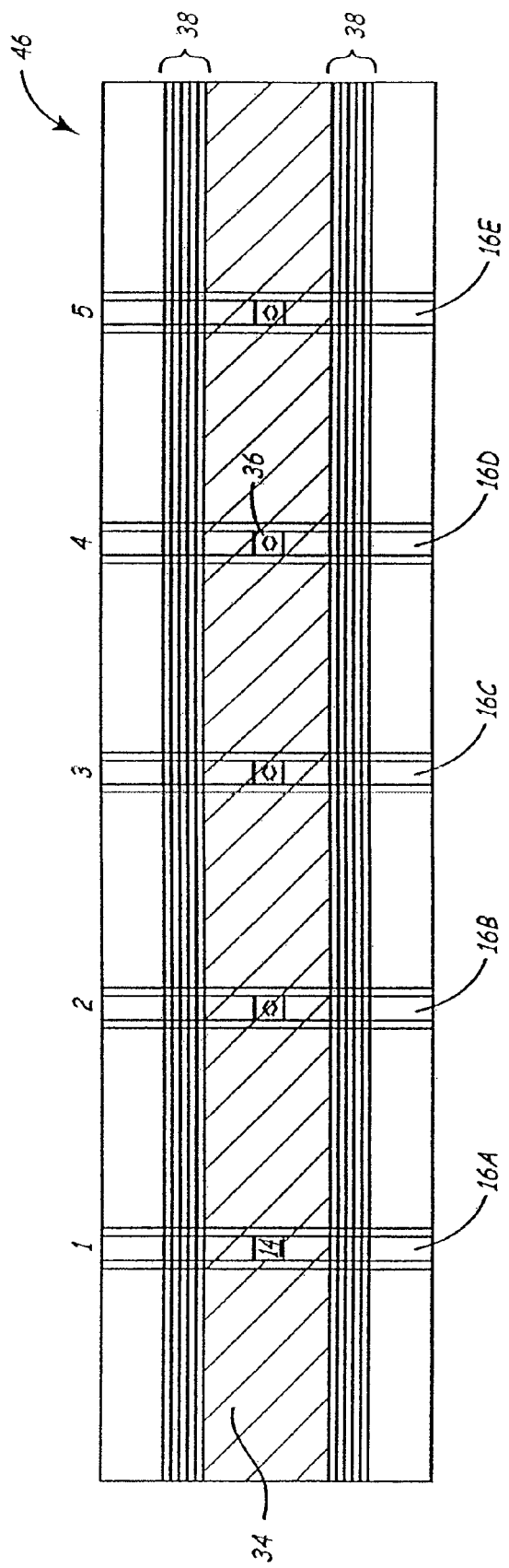
FIG. 15 is a head assembly showing various patterns of thin film.

FIG. 15 represents a modified embodiment of a multi-channel head wherein the channels are all coupled together. Once again, cross talk between channels is not an issue. Here, thin film layer 34 is contained between upper and lower bounds defined by air bleed slots 38. This arrangement avoids the above discussed issue of cutting through the thin film layer 34 or depositing the thin film layer 34 over existing air bleed slots 38. The production of this thin film 34 pattern can be accomplished in various ways. For example, prior to creating air bleed slots 38, a thin film 34 could be deposited over the entire upper surface of head 46. Then, areas of that thin film could be removed; leaving only the area designated in FIG. 15. This deposition could be selectively defined by a selective plating or a selective sputtering process used with the appropriate masks, or the film could be selectively removed after deposition, using any known technique.

Figure 16:
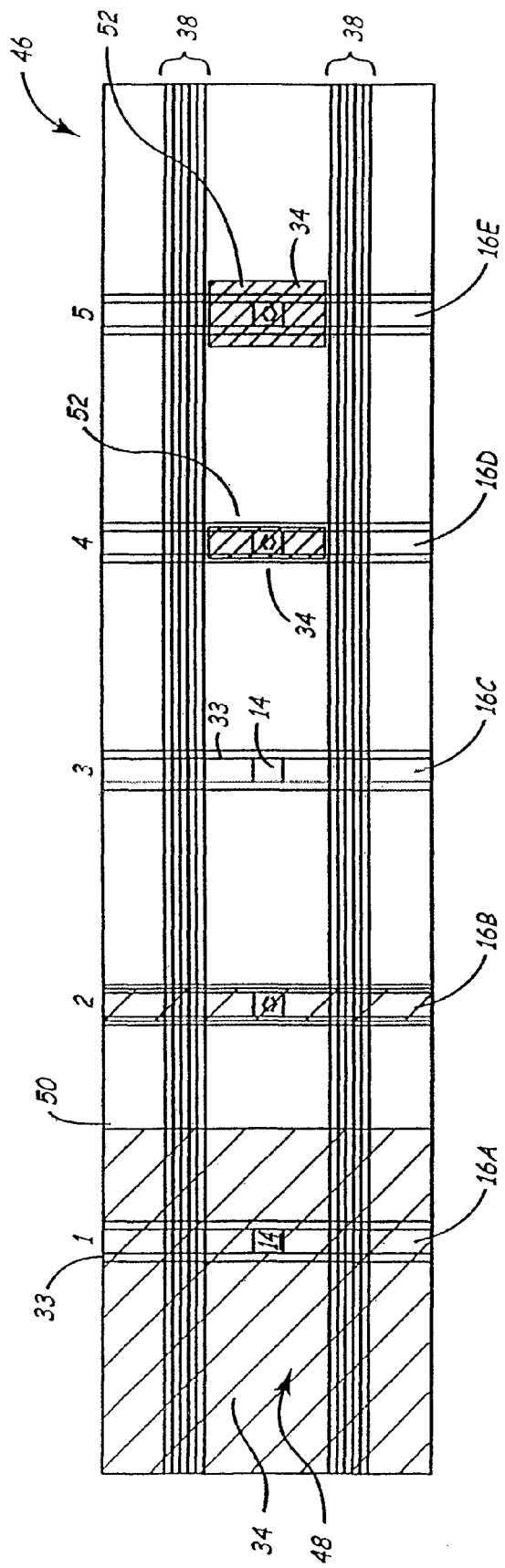
FIG. 16 is a head assembly showing various patterns of thin film.

Turning to FIG. 16, thin film layer 34 can also be configured for use with independently driven channels in a multi-channel head. In order to be operable, each channel must be magnetically isolated from its adjoining channels. Primarily, this accomplished by ceramic sections 32A-32E. However, if thin film layer 34 were continuous from one channel to the next, cross talk would occur, thus eliminating the ability to independently control the channels. As such, with any independently driven, multi-channel head 46, the magnetically permeable thin film layer 34 must be absent between the various channels. The pattern 48 of thin film 34 (covering channels 1 and 2) in FIG. 16, illustrates the simplest way of accomplishing this. A strip 50 is devoid of the thin film 34, over the entire length of the head. In this arrangement, the remaining thin film layer 34 extends across the air bleed slots 38. Strip 50 can be formed by preventing the deposition of the thin film 34 in this area during formation, i.e., platting or lithography, or by removing it after its application. The minimum width of strip 50 is determined by the minimum barrier required to prevent problematic cross talk and depends on the specific parameters of the completed head 46. This embodiment has the advantage of maintaining a large film surface which may be advantageous in minimizing the wear of the surface film and thus increase the lifetime of the head.

Alternatively, elimination of areas of thin film 34 between adjacent channels is advantageous in that it eliminates a high permeability flux leakage path that limits the flux across the writing gaps. Hence, elimination of the surface film between the channels will provide for the maximization of magnetic flux flowing uniformly across the writing gaps 36.

Figure 17:
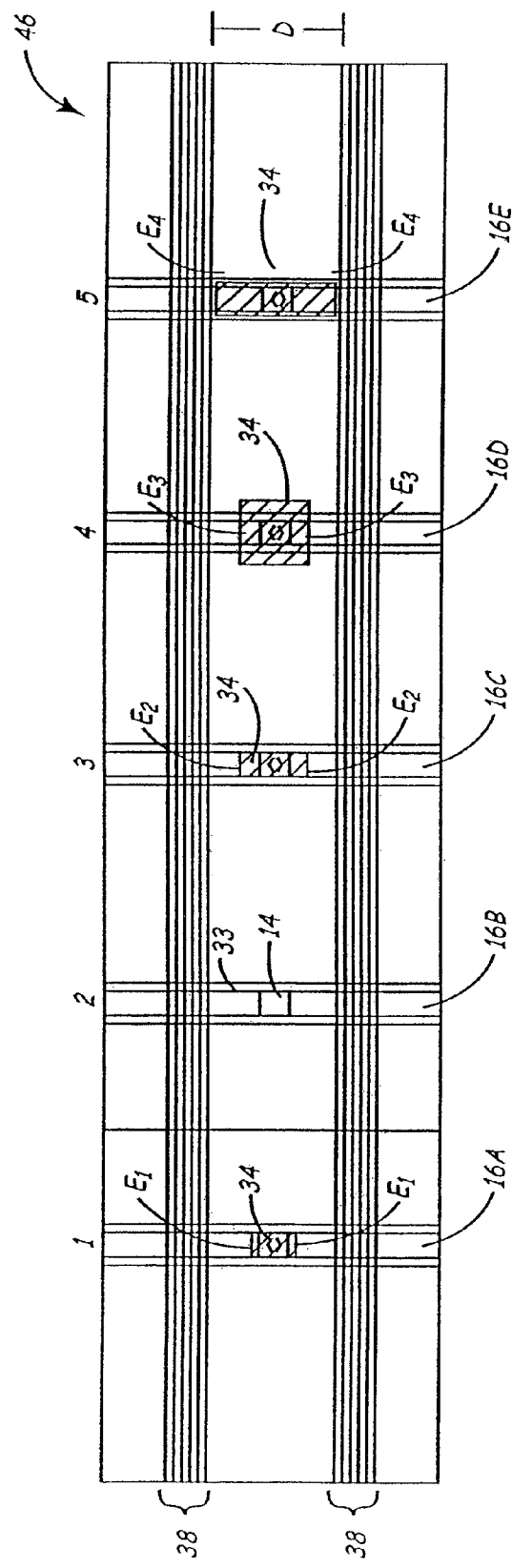
FIG. 17 is a head assembly showing various patterns of thin film.

Channel 3 is shown devoid of a thin film layer 34 for ease of illustration. Writing gaps 36 simply illustrate their position, if thin film layer 34 were present. Channels 4 and 5 have thin film layer 34 applied over them by pattern 52. Here, pattern 52 is contained within the air bleed slots 38, while also providing adequate channel separation. Pattern 52 illustrates that smaller areas of thin film layer 34 are sufficient to accomplish the completion of the head 46. FIG. 17 illustrates a furtherance of this concept. Specifically, channel 1 shows an approximation of what would be the minimal acceptable amount of coverage for thin film layer 34. Here, thin film layer 34 is just sufficient to contact each pole of ferrite column 16A. The amount of contact need only be sufficient to allow the generated magnetic flux to enter and pass through thin film layer 34. The width of thin film layer 34 is shown to be contained within glass beading 33. This width could be reduced further, however the minimum width must be sufficient to allow for writing gaps 36. Though such further minimization is possible, it is optimal to have thin film layer 34 at least equal the width of the ferrite poles 16A to assure proper flux transfer and to prevent the exposure of the corners of ferrite column 16A. For purposes of patterning the channel width of thin film 34, the relevant edges can be defined to fall within the width of the glass bond 33. Such exposed corners will be localized maximums in the magnetic field and will likely improperly write the media. Channel 2 is devoid of thin film layer 34 (for ease of illustration), while channels 3-5 show other patterns which are possible. Virtually any size or shaped pattern could be obtained, so long as sufficient channel separation occurs.

Though various patterns are achievable, certain factors will determine which patterns are preferable for any given head 46. To illustrate these factors it should be understood that the thin film 34 layer serves a dual purpose. First, it completes a magnetic circuit by coupling together the poles in the ferrite columns (with or without the additional consideration of channel separation). Second, the thin film layer 34 acts as a tape bearing surface as the media is pulled across the recording head 46. As such, the minimum amount of coverage provided is limited by what is acceptable to create the magnetic circuit. Ultimately, the maximum amount could encompass the entire upper surface of the recording head 46. In some cases, such maximized coverage is acceptable. As discussed, it is often desirable to avoid any interaction between the thin film layer 34 and the air bleed slots 38. Then, the maximum amount of coverage is defined by the distance D (FIG. 17) between the innermost air bleed slots 38.

An additional consideration arises when an edge (E1-E4) of the thin film layer 34 is located within the area defined by distance D and the width of the head 46. Namely, the media will strike or engage that surface E1-E4 as it moves across the head 46. This is normally not a consideration when the thin film 34 covers the entire head 46 because the edge of the thin film 34 corresponds with the edge of the head 46 and this occurs at the most extreme point of curvature (due to the radiused head 46). When an edge E1-E4 is located closer to the gaps 36 located over ceramic member 14, and the media engages this edge at speed, it may be caused to skip or jump away from the head 46. This issue is problematic if it is random and unpredictable and/or if the media does not reengage the head prior to the writing gaps 36. Obviously, if it skips the writing gaps 36 the media cannot be properly written. Therefore, if an edge E1-E4 is to occur, it is preferable that it occur further from the writing gaps 36 occurring over ceramic member 14, as illustrated in channel 5, by edge E4. In this location, if skipping or jumping occurs, the media has a longer distance to correct itself. This self correction may also be aided by the curvature of the head 46. Furthermore, the pattern shown by channels 4 and 5 is also advantageous in that a majority of the material transition regions are covered by the thin film 34, thus preventing them from damaging or inappropriately writing the media. The transition regions include the transition from ceramic to glass, from glass to ferrite, and from ferrite to ceramic.

To create the various patterns of thin film layer 34, any known method of generating and defining a thin film can by utilized. For example, larger areas can have a thin film deposited on them and then wet etching or ion milling can be used to remove sections. Alternatively, the thin film may simply be deposited in the specific pattern desired. Such techniques are well known and relatively easy to perform.

In operation, magnetic recording head 46 is secured to an appropriate head mount. Magnetic tape is caused to move over and in contact with the tape bearing surface of the head 46. At the appropriate periodic interval, electrical current is caused to flow through the coils 44. As a result, magnetic flux is caused to flow through the back-bar 40, through the ferrite columns 16A-16E, and through the magnetic thin film 34 (as the ceramic member 14 minimizes a direct flow from one pole of the ferrite column 16A-16E to the other, causing the magnetic flux to shunt through the permeable magnetic film). As the magnetic flux travels through the magnetic thin film 34, it leaks out through the writing gaps 36, thus causing magnetic transitions to occur on the surface of the magnetic tape, in the same pattern and configuration as the gaps 36 itself.

The above head fabrication process has been described with respect to a magnetic recording head employing a timing based servo pattern. However, the process could be applied equally well to any type of surface film recording head.

The present disclosure presents a plurality of elements and concepts which work in a synergistic arrangement to arrive at a highly efficient surface film magnetic recording head. It is to be understood that these various elements and concepts can be effectively utilized alone or in other combinations than disclosed while still remaining within the spirit and scope of the present invention. Namely, using a columned or combed head member in and of itself produces a higher quality and more efficient head. Similarly, removing the high reluctance back-gap and replacing it with one or more magnetically permeable back-bars leads to a better and more efficient surface film recording head. Utilizing both the combed structure and back-bars produces an optimal head, achieving synergistic results. Finally, utilizing a specific pattern of magnetically permeable thin film to isolate the channels and to act as the tape bearing surface, can be used alone or in combination with the above aspects of the present invention to arrive at a superior recording head.

Comparing two heads, each wound with two turns of wire and driven by the same single channel drive circuit, the head pursuant to this invention (FIG. 13) exhibits a current rise time in the 20 nanosecond range while the high inductance head made pursuant to the Albrecht et al. patent (FIG. 18) exhibits current rise time in the 50 nanosecond range. The corresponding inductances were measured to be about 250 nH and 700 nH, respectively, for the two heads. The shorter rise time corresponds roughly to the L/R time constant of the head as a circuit element. Hence the low inductance magnetic recording heads of the present invention are capable of recording timing based signals on media resulting in sharper magnetic transitions than media written with previously known heads. As a result, both the heads produced and the media written by those heads will perform significantly better than the prior art heads and the media produced by them. With due consideration to the details of the write circuitry, one can expect to at least double the bandwidth by the use of the low inductance head of the present invention. Even more dramatic results can be expected with the independently driven, multi-channel low inductance head, as illustrated in FIG. 12, while taking into account the limitations of the multi-channel drive circuitry.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

I claim:

1. A method of formatting magnetic tape media comprising independently energizing a plurality of independent recording channels of a surface thin film magnetic recording head by way of a separate electrically conductive coil for each recording channel, each recording channel comprising a timing-based recording gap for formatting a respective servo band of the media with a corresponding timing-based signal.

2. The method of claim 1, wherein the electrically conductive coils are driven independent in time.

3. The method of claim 1, wherein the electrically conductive coils are driven independent in phase.

4. The method of claim 1, wherein the electrically conductive coils are driven with the same timing-based signal pattern.

5. The method of claim 1, wherein the independent recording channels are magnetically isolated.

6. The method of claim 5, wherein the independent recording channels are magnetically isolated by substantially magnetically impermeable material.

7. The method of claim 5, wherein the independent recording channels are magnetically isolated at least in part by gaps in the surface thin film of the surface thin film magnetic recording head.

8. A method of formatting magnetic tape media comprising independently energizing a plurality of independent timing-based recording channels of a surface thin film magnetic recording head with different electrical signals so as to format respective servo bands of the media with different information.

9. The method of claim 8, wherein the different electrical signals are independent in time.

10. The method of claim 8, wherein the different electrical signals are independent in phase.

11. The method of claim 8, wherein the independent recording channels are magnetically isolated.

12. The method of claim 11, wherein the independent recording channels are magnetically isolated by substantially magnetically impermeable material.

13. The method of claim 11, wherein the independent recording channels are magnetically isolated at least in part by gaps in the surface thin film of the surface thin film magnetic recording head.

14. A method of formatting magnetic tape media comprising providing independent electrical signals to each of a plurality of independent and magnetically isolated timing-based recording channels of a surface thin film magnetic recording head by way of a separate electrically conductive coil for each recording channel.

15. The method of claim 14, wherein the electrical signals are independent in time.

16. The method of claim 14, wherein the electrical signals are independent in phase.

17. The method of claim 14, wherein the plurality of independent recording channels are magnetically isolated by substantially magnetically impermeable material.

18. The method of claim 14, wherein the plurality of independent recording channels are magnetically isolated at least in part by gaps in the surface thin film of the surface thin film magnetic recording head.

* * * * *